125,344

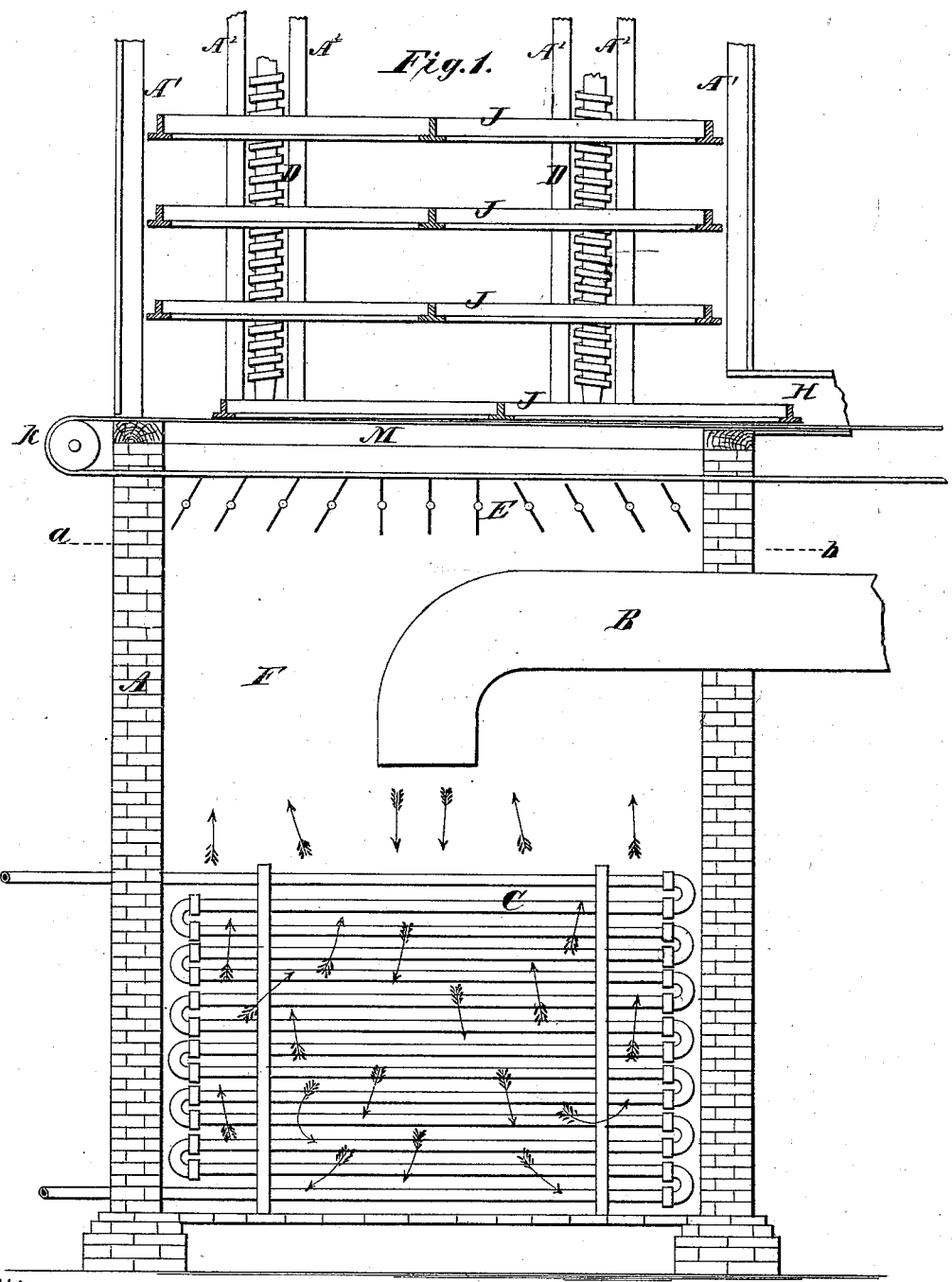

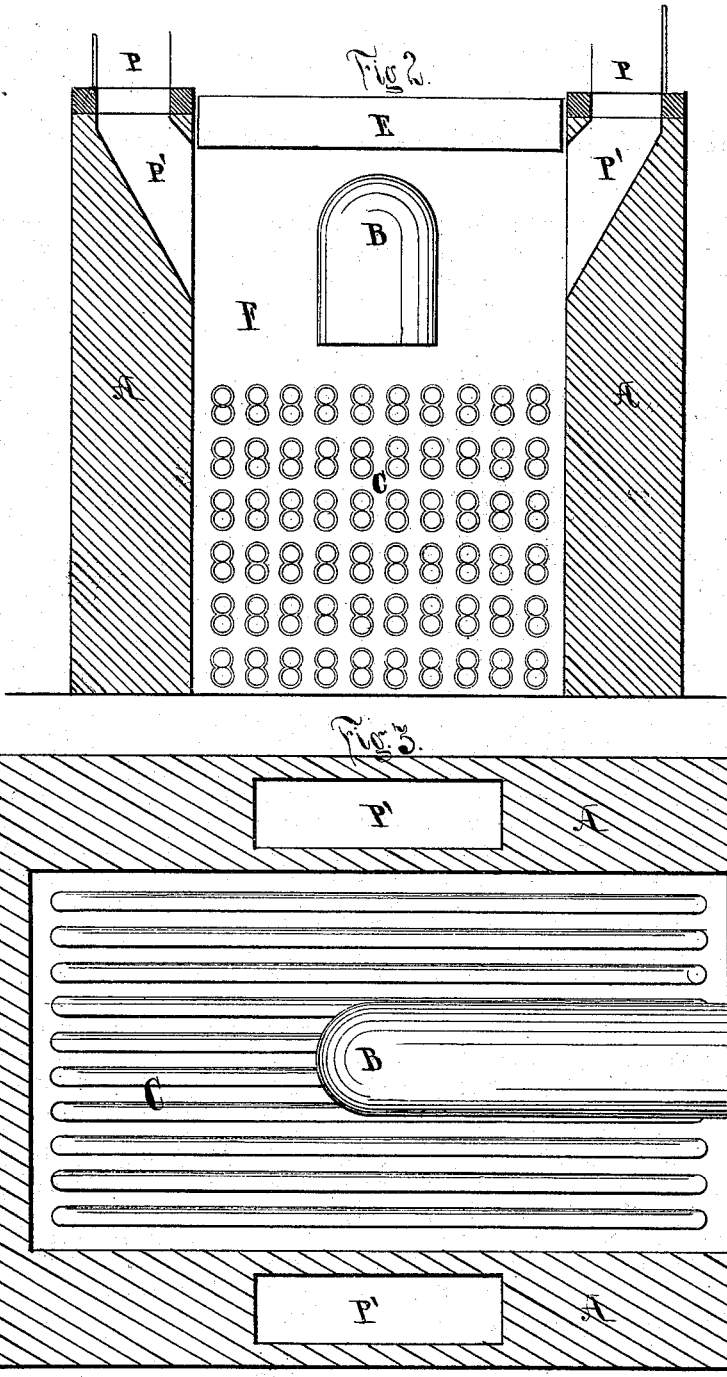

UNITED STATES PATENT OFFICE.

MARSHALL P. SMITH, OF BALTIMORE, MARYLAND.

IMPROVEMENT IN DRIERS.

Specification forming part of Letters Patent No. 125,344, dated April 2, 1872.

I, MARSHALL P. SMITH, of the city of Baltimore and State of Maryland, have invented certain Improvements in those Drying-Machines in which the articles to be dried are subjected to a current of air artificially heated, of which the following is a specification:

This invention relates to improvements in drying-machines; and consists of a new method of heating the air in or for that class of drying-machines which are operated with a forcible blast. The distinctive features of this invention are that the blast of air is free and unrestrained; descending upon the heater from above by the force imparted to it by the fan; that it circulates at will between or around the pipes, influenced and directed only by the counter-currents caused by its own reverberation until its initial force is expended, when it rises, passing again between and around the pipes, and discharges into the evaporating-chamber. The advantages gained are, first, an increased degree of temperature of blast from a decreased amount of heating-surface; and second, a more uniform distribution of an ascending current of air over the whole area of the platforms containing the substances to be dried.

Figure 1 represents in vertical longitudinal section, Fig. 2 in vertical transverse section, and Fig. 3 in horizontal transverse section, through line $a\,b$, the application of the improvements to my vertical screw-drier patented September 13, 1870.

For the heating apparatus, I prefer a system of steam-pipes, C; first, because the temperature is the same in all parts; and second, because the numerous pipes act effectually in breaking up the descending volume of air, and dispersing it to all parts of the chamber. I have used a coal-furnace for the purpose, but have not found it so economical or desirable. B is the pipe for introducing the blast of air. It may enter from the side, with an elbow on the inner end, as shown in the drawing, or in any other position, the effect of which is to cause the entering current of air to be thrown downward upon the heater. This pipe may have one, two, or more vents into the chamber; or separate pipes may be used. Fans or blowers are used to supply the air, which should be driven with sufficient force to penetrate through the heating apparatus to the bottom. In its descent it will be deflected by the steam-pipes, and meeting the rising current it will be scattered, and having no outlet of escape but in an upward direction, will be distributed over the chamber with great uniformity.

In the drying of fruits and vegetables by an ascending current of air it sometimes happens that one part of the platforms or trays contains fruit, which, from being cut in larger pieces or other causes, dries more slowly than the rest, and it is then desirable to direct a greater amount of air to that point. For this purpose I use vanes or dampers E, which may be moved singly or coupled together in pairs or sets.

It is manifest that this process is applicable to all descriptions of drying apparatus which are operated by forcible currents of heated air, whether the air is heated under the evaporating-chamber or in a separate or adjoining hot-air chamber.

Having now described my invention, what I claim as new, and desire to secure by Letters Patent, is—

1. The process of heating the air for drying-machines by a combination of descending and ascending currents of forced air, substantially as herein shown and described.

2. The drying-chamber A', the heating-chamber A, the heater C, and the pipe B, in combination with a downward blast of air, substantially as herein described.

MARSHALL P. SMITH.

Witnesses:
W. W. WOOLFORD,
JAS. W. KIRKMAN.